Nov. 28, 1933.  H. C. FORD ET AL  1,937,336
FIRE CONTROL SYSTEM
Filed Dec. 10, 1927  4 Sheets-Sheet 1

Fig.1.

INVENTORS
Hannibal C. Ford and
BY Elliott P. Ross
ATTORNEYS

Nov. 28, 1933.  H. C. FORD ET AL  1,937,336
FIRE CONTROL SYSTEM
Filed Dec. 10, 1927  4 Sheets-Sheet 4

INVENTORS
Hannibal C. Ford and
Elliott P. Ross
BY Moahley and Gill
ATTORNEYS

Patented Nov. 28, 1933

1,937,336

UNITED STATES PATENT OFFICE 1,937,336

FIRE CONTROL SYSTEM

Hannibal C. Ford, Jamaica, and Elliott P. Ross, Forest Hills, N. Y., assignors to Ford Instrument Company, Inc., Long Island City, N. Y., a corporation of New York Application December 10, 1927
Serial No. 239,140

43 Claims. (Cl. 89—41)

This invention relates to a system for controlling the fire of ordnance and while especially intended for controlling ordnance used against aerial targets may be employed for ordnance used against surface targets.

It is an object of the invention to provide in such a system a controlling instrument or director in which the effect of angular movement of the craft on which the instrument is mounted may be eliminated so that the operation of following a target in train and elevation may be performed as if the instrument were mounted upon a stable platform thereby promoting ease and accuracy of operation which is particularly advantageous when the instrument is being employed against rapidly moving aerial craft.

It is a further object of the invention to provide in connection with and in part operable from the director an instrument for introducing the desired angular displacements of a gun from the line of sight of the director, commonly known as sight depression and sight deflection, and for calculating the ever changing train and elevation necessary to be applied to the gun in order that its aim may be preserved in spite of the angular motion of the craft.

The angular motion of the craft relative to a horizontal plane may be divided into two components hereinafter referred to as level and cross level. Level designated L, is the inclination of the deck to the horizon in the plane of fire. Cross-level, designated Z, is the inclination of the deck to the horizon 90° to the plane of fire.

The particular nature of the invention as well as other objects and advantages thereof will clearly appear from a description of a preferred embodiment as shown in the accompanying drawings in which.

Figure 1:
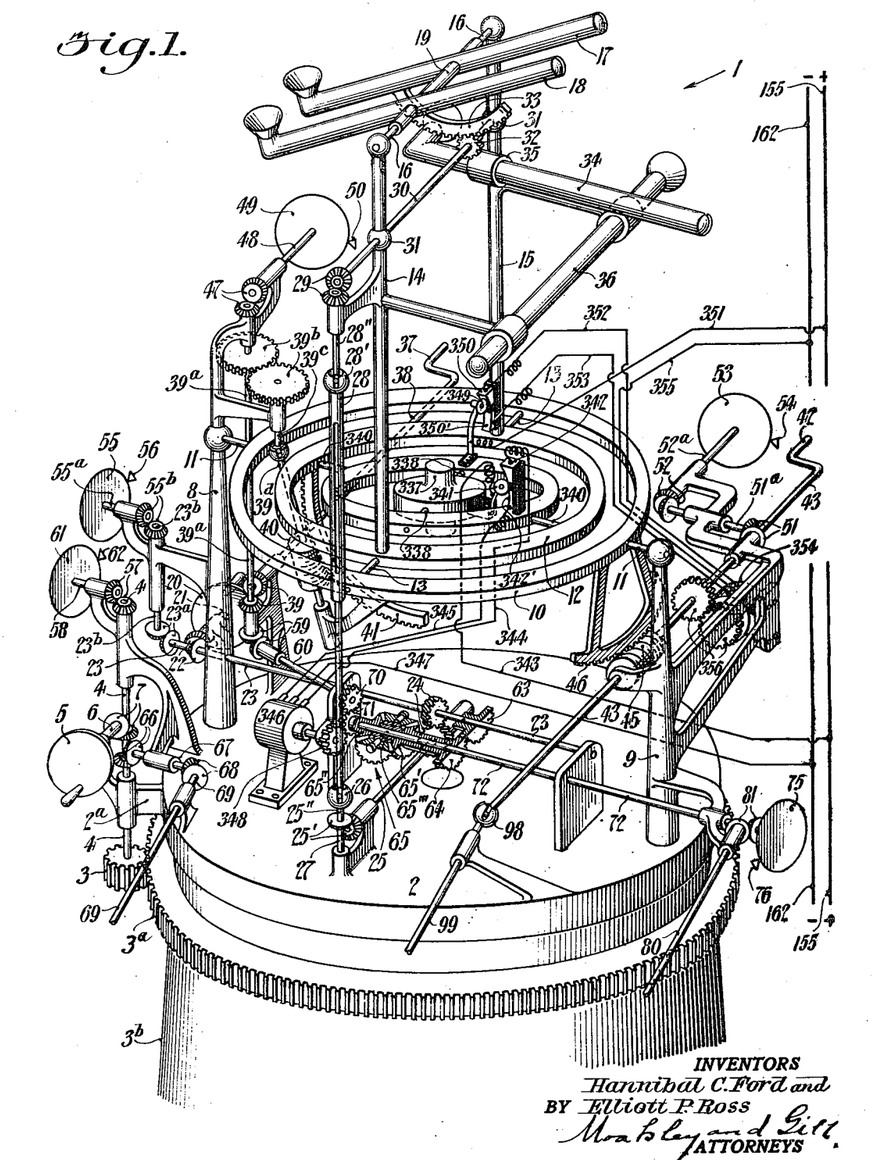
Fig. 1 is a diagrammatic perspective view of the director which forms part of the fire-control system.

Referring to the drawings, and particularly to Fig. 1, 1 indicates a director which is provided with a rotatable training table 2 the periphery of which is furnished with a bracket 2a rigid therewith below which a pinion 3 is mounted on a shaft 4 that is journalled in said bracket, as well as in another bracket. The pinion 3 is in mesh with a stationary annular rack 3a, which is fastened to the top of a suitable pedestal 3b that is fixed to a supporting platform or structure that is rigid with the ship upon which the director is mounted. Upon the operation of a trainer's handwheel 5, a drive is established through a shaft 6, bevel gears 7, shaft 4 and pinion 3, whereby this pinion is oriented about the stationary annular rack 3a. The shaft 4 necessarily accompanies pinion 3, and through its supporting brackets turns the table 2 in train.

Rigidly mounted on and extending upward from the training table 2 is a pair of diametrically opposed standards 8 and 9 between which an outer gimbal ring 10 is mounted by trunnions 11 that are journalled in the upper ends of the standards 8 and 9. A second gimbal ring 12 is mounted in the outer gimbal ring 10 by trunnions 13 that are disposed perpendicularly to the trunnions 11.

Other standards 14 and 15 rise from the second gimbal ring 12, and have a rotary shaft 16 journalled in their upper ends. Mounted on the shaft 16 to turn with it is a pointer's telescope 17 and a trainer's telescope 18 connected by a bridge 19, so that they may be rocked in unison in elevation. To move the pointer's and trainer's telescopes 17 and 18 in elevation, the pointer's handwheel 20 is turned, thereby operating a shaft 21, bevel gears 22, a shaft 23, spiral gears 24, a shaft 25, bevel gears 25' and shaft 25''. The upper end of shaft 25'' is connected to a universal joint 26 through which the drive is continued by a shaft 27 having a sliding connection with a sleeve 28, the upper end of which is connected by a universal joint 28' to a shaft 28'' which is connected through bevel gears 29 to a shaft 30 journalled in bearings 31 on the standards 14 and 15. A pinion 32 on shaft 30 meshes with a sector 33 that is rigidly combined with the pointer's and trainer's telescopes 17 and 18. Thus, operation of the pointer's handwheel 20 effects the turning of the pointer's and trainer's telescopes 17 and 18 in elevation. This elevation from the plane of the ring 12 represents the angle of the line of sight from the horizon, which will be designated as the altitude angle A. These telescopes are turned in azimuth through the operation of the trainer's handwheel 5, by reason of the turning of the training table 2, as already set forth.

That the plane of the ring 12 may be kept in the plane of the horizon a levelling telescope 34 is mounted in a bracket 35 that is fast on the standard 15 that is carried by the second gimbal ring 12, and a cross levelling telescope 36 arranged perpendicularly to the telescope 34 and mounted on the standards 14 and 15. Each of the telescopes 34 and 36 normally bears on the horizon, but, if the ship rolls in the direction of the plane that contains the line of sight, the usual horizontal cross wire of the levelling telescope 34 will depart from the image of the horizon. Thereupon, a crank handle 37, shown in Fig. 1, is operated, turning a shaft 38 that is mounted in a bearing bracket that is affixed to the training table 2. Driven by the shaft 38 are bevel gears 39 that in turn drive a shaft $39a$, gears $39b$, a shaft $39c$, a universal joint, a shaft $39d$ and a worm 40, which actuates an arcuate rack 41 that is rigidly attached to the inner gimbal ring 12. In this manner, and with a proper direction of rotation of the crank handle 37, the inner gimbal ring 12 and the levelling telescope 34 are turned reversely to the direction of roll through a levelling angle L, seen in Fig. 4, until the horizontal cross wire of the levelling telescope 34 is coincident with the horizon.

Similarly, when own ship rolls perpendicularly to the plane that contains the line of sight, the horizontal cross wire of the cross levelling telescope 36 departs from the image of the horizon. Then, a crank handle 42 is operated to turn a shaft 43 that is mounted in bearings in brackets carried by the standard 9. Fast on shaft 43 is a worm 45 that is in mesh with a sector 46 that is fastened to the outer gimbal ring 10, and rotation of the crank handle 42 in the proper direction will so turn worm 45 as to drive the sector 46 reversely to the cross roll of the ship through a cross levelling angle Z, shown in Fig. 5. As the sector 46 is rigid with the outer gimbal ring 10, the latter is also turned about the axis of its trunnions 11 through the angle Z, and, due to the connection between the outer and inner gimbal rings 10 and 12 through the trunnions 13 the second gimbal ring 12 too is turned about the axis passing through the trunnions 11 by the amount of the cross levelling angle Z.

It is thus apparent that by these levelling and cross levelling operations through the angles L and Z the second gimbal ring 12 is kept horizontal. Since the levelling and cross levelling begins as soon as the development of the L and Z angles becomes apparent, the second gimbal ring 12 is always maintained substantially horizontal and establishes a plane of reference parallel to the horizon.

In operating the crank handle 37 in accordance with the levelling angle L, the shaft 38 operates bevel gears 39 and the shaft $39a$, bevel gears 47 and a shaft 48 to set a dial 49 against a pointer 50 to give a reading of the levelling angle L. In like maner, actuation of crank handle 42 proportionately to the cross levelling angle Z causes shaft 43 to drive through bevel gears 51, a shaft $51a$, bevel gears 52 and a shaft $52a$ to set a dial 53 against a pointer 54 to give a reading of the measure of the cross levelling angle Z.

Figure 3:
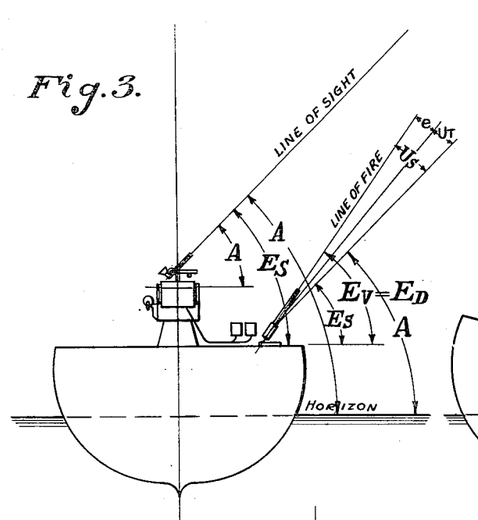
Fig. 3 is a diagrammatic view, showing own ship upright, and illustrating various angles in connecton with the horizon and deck as related to the lines of sight and fire.
Figure 4:
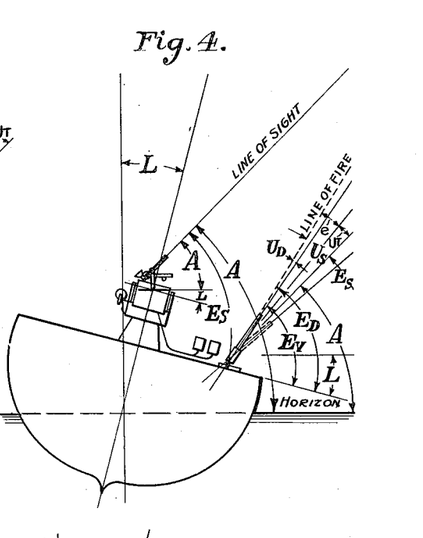
Fig. 4 is a view similar to Fig. 3, but showing the angular relations when the ship has rolled in the plane of sight, level L.

Inasmuch as the combined levelling and cross levelling of the second gimbal ring 12 establishes a horizontal reference plane, as already set forth, the inclination of the line of sight from the telescopes 17 and 18 with reference to this plane represents the altitude angle of sight from the horizon in a vertical plane. This altitude angle is designated as A, and is shown in Figs. 3 and 4. That the value of the altitude angle A may be readily known, a dial 55 is mounted on and turns with a shaft $55a$ to read against a pointer 56, the shaft $55a$ being driven from the pointer's handwheels 20, shaft 21 through bevel gears 22, shaft 23, bevel gears $23a$, a shaft $23b$ and bevel gears $55b$.

It has been explained that the pointer's and trainer's telescopes 17 and 18 are trained by the actuation of the trainer's handwheel 5, and this is in accordance with the relative bearing of the target to own ship's head, if there were no cross level. This quantity will hereinafter be referred to as director train and designated Bs. The shaft 4, shown in Fig. 1, is connected through bevel gears 57, and a shaft 58 with a dial 61 that is fast on such shaft and reads against a pointer 62 to give a reading of Bs.

As will be seen in Fig. 3 the angle between the deck of the ship and the line of sight is referred to as the Es angle, and, since the line of sight is kept related to the horizon, and not to the deck, the angle Es varies positively or negatively, according to which way the ship rolls. As shown in Fig. 4, the angle Es has been augmented by the inclusion of the levelling angle L. It is to be noted from Fig. 3 that, when there is zero roll, the angle Es is equal to the sight altitude angle A. Therefore, when the ship has rolled as shown in Fig. 4, the angle Es is equivalent to the sum of the angles A and L, as indicated in Fig. 4. When the ship rolls in the opposite direction, the levelling angle L is subtracted from the angle A. Consequently, the angle Es is the result of the algebraic addition of the angles A and L.

To obtain the value of the angle Es in the instrument the shaft 23, which is controlled by the pointer's handwheel 20, operates a spur gear 63 that drives another such gear 64 that is rigidly combined with one side 65' of a differential 65. Therefore, the differential side 65' is operated in accordance with the value of the sight altitude angle A, as set up by the dial 55 and its pointer 56. Operation of the levelling crank handle 37 in one direction or the other, according to whether the ship rolls in a positive or negative direction, establishes a drive from shaft 38 through bevel gears 39, shaft $39a$, bevel gears 59, a shaft 60 and a spiral gear 70. This gear drives a similar gear 71 and another side 65'' of differential 65 according to the value of the levelling angle L, as indicated by the dial 49 and pointer 50. The center 65''' of differential 65 is consequently actuated in correspondence with the algebraic sum of the angles A and L, which is equal to the angle Es. The differential center 65''' is fast on a shaft 72, which thus turns proportionately to the value of the angle Es, as does a dial 75, the latter reading against a pointer 76 to show the value of the angle Es.

Figures 5, 6:
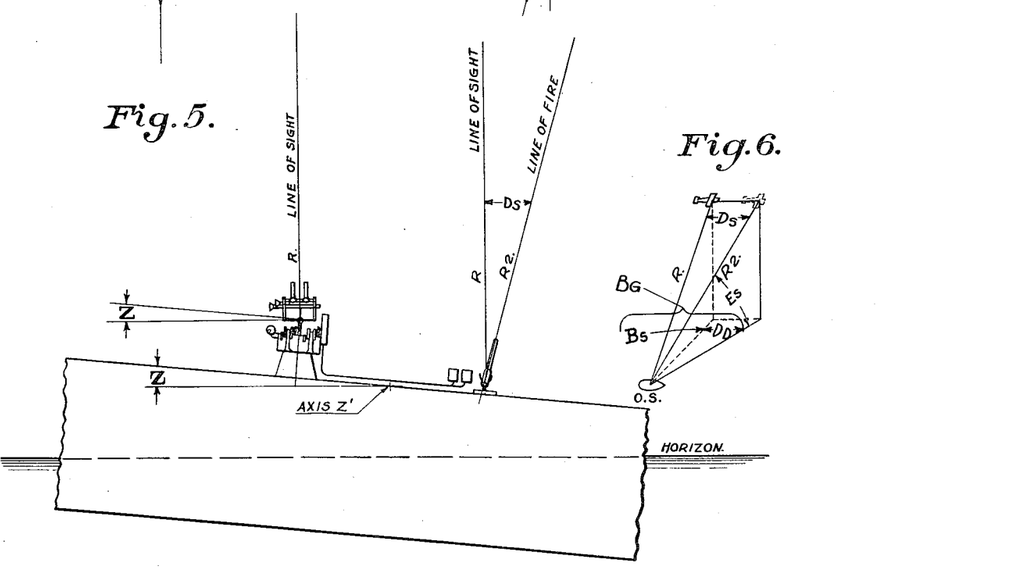
Fig. 5 is a diagrammatic view illustrating the effect of roll of the ship at right angles to the plane of sight, cross level Z.
Fig. 6 is a perspective view illustrating the relation of the lateral deflection angles both in the plane of sight and the plane of the deck of the ship.

Because of the cross roll the line of sight of the instrument would be thrown off the target, as will be understood from Fig. 5, wherein the ship is shown as having cross rolled through the angle $Z$ about an axis which may be regarded as the axis $Z'$ in the plane of the deck, were it not for the actuation of the cross levelling mechanism that includes the worm 45 and the sector 46, whereby the outer gimbal ring 10 acts through its trunnion 13 to move the second gimbal ring 12 to offset the effect of the cross roll and maintain the sights on the target.

While the line of sight is maintained on the target by proper actuation of the mechanism, the guns, except for manipulation to avoid it, partake of the roll and cross roll of the ship. Accordingly, means have been provided to preserve the intended positioning of the guns, so that the proper trajectories from them to the target will be unaffected by the roll and cross roll of the ship. This results in a lateral deflection of the guns that is identified as the angle $D_D$ in the plane of the deck and a vertical deflection $U_D$ perpendicular to the deck.

The angle $D_D$, as seen from Fig. 6, is in definite geometrical relation to the lateral sight deflection angle $D_S$, the latter angle being in the inclined plane from own ship, O. S., to the aerial target. The angle $D_S$ is the angle which the inclined line of sight generates in continuing to bear on the moving target in that portion of the travel of the latter that occurs during the time the projectile fired from own ship takes to reach the target at its predicted position, which is the point of burst of the shell.

Elevation of the gun in a vertical plane requires a datum for its measurement, and the natural one is the deck upon which it is mounted. Therefore, the total angle of elevation of the gun above the deck is conveniently designated as the angle $E_V$, which angle, however, is uncorrected for the cross roll of the ship that is responsbile for the angle $U_D$ already referred to.

Included in the angle $E_V$ is the angle $U_S$, which is a vertical deflection angle that begins at the upper edge of and extends above the $E_S$ angle that gives the measure of the elevation of the director sight above the deck. The angle $U_S$ results from the vertical component of the prediction of the future position of the targets at the point of burst of the shell, as well as from ballistics, and is affected by corrective angles in elevation introduced to offset the effect of wind, etc. Reference to Fig. 3 shows that the angle $U_S$ includes a vertical prediction angle $U_T$, which cooperates with a horizontal prediction angle that is referred to elsewhere in determining the predicted position of the target. Also included in the angle $U_S$ is a superelevation angle $e$, by the amount of which the gun is elevated above the combined angles $E_S$ and $U_T$ to secure the proper trajectory for the projectile to hit the target.

Figure 7:
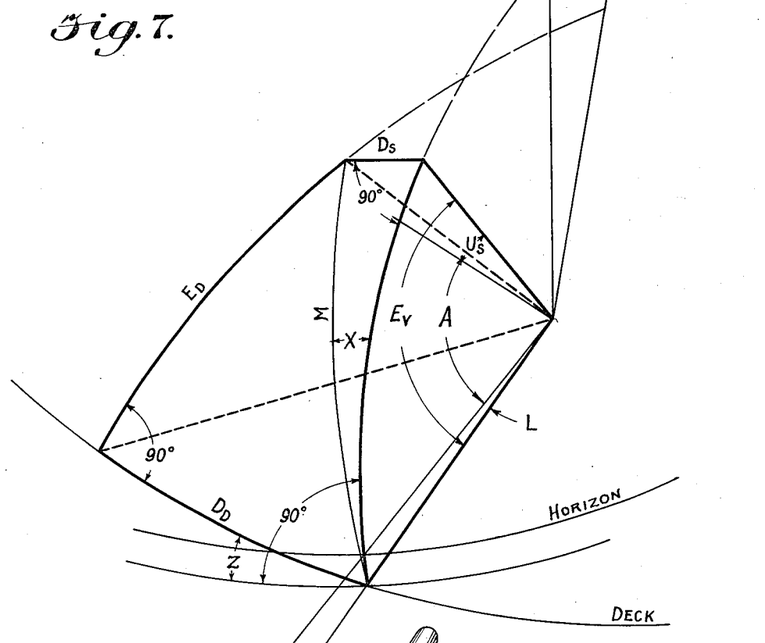
Fig. 7 is a perspective diagram illustrative of the derivation of certain formulæ.

These angles are shown in Fig. 7 in which the angles A, L, $U_S$, $E_V$, $Z$ and $D_S$ correspond to similarly designated angles in Figs. 3, 4, 5 and 6 hereinbefore referred to. $E_D$ represents the elevation, corrected for cross level, of the guns from the deck and as indicated equals $E_V - U_D$. The angles $M$ and $X$ are working angles employed in deriving the formulæ.

Also in this figure the position of the deck shown is tipped from a horizontal plane by the angle $L$ in the plane of sight and at right angles thereto by the angle $Z$.

In accordance with the principles of spherical trigonometry, (1) $\tan X = \dfrac{\tan D_S}{\sin E_V}$ (2) $\sin M = \dfrac{\sin D_S}{\sin X}$ (3) $\tan D_D = \sin (Z+X) \tan M$ (4) $\sin E_D = \cos (Z+X) \sin M$ (5) $\cot M = \dfrac{\cos X}{\tan E_V}$ or $\tan M = \dfrac{\tan E_V}{\cos X}$ (6) $\sin (Z+X) = \sin Z \cos X + \cos Z \sin X$ Substitute (6) in (3)

(7) $\tan D_D = (\sin Z \cos X + \cos Z \sin X) \tan M$

Substitute (5) in (7)

(8) $\tan D_D = (\sin Z \cos X + \cos Z \sin X) \dfrac{\tan E_V}{\cos X}$ (9) $\cos X = \dfrac{\sin X}{\tan X}$ Substitute (1) in (9)

(10) $\cos X = \dfrac{\sin X \sin E_V}{\tan D_S}$

Substitute (10) in (8)

(11) $\tan D_D = (\sin Z \cos X + \cos Z \sin X) \dfrac{\tan E_V \tan D_S}{\sin X \sin E_V}$ (12) $\dfrac{\sin E_V}{\tan E_V} = \cos E_V$ Substitute (12) in (11)

(13) $\tan D_D = (\sin Z \cos X + \cos Z \sin X) \dfrac{\tan D_S}{\sin X \cos E_V}$ from (13)

(14) $\tan D_D = \dfrac{1}{\cos E_V} \left( \sin Z \dfrac{\tan D_S}{\tan X} + \cos Z \tan D_S \right)$ Substituting (1) in (14)

(15) $\tan D_D = \dfrac{1}{\cos E_V} (\sin Z \sin E_V + \cos Z \tan D_S)$ (16) $\sin (E_V - E_D) = \sin E_V \cos E_D - \cos E_V \sin E_D$ (17) $\cos M = \cos E_D \cos D_D = \cos E_V \cos D_S$ (from diagram) from (17)

(18) $\cos E_D = \dfrac{\cos E_V \cos D_S}{\cos D_D}$

Substitute (2) in (4)

(19) $\sin E_D = \cos (Z+X) \dfrac{\sin D_S}{\sin X}$ (20) $\cos (Z+X) = \cos Z \cos X + \sin Z \sin X$ Substitute (20) in (19)

(21) $\sin E_D = \dfrac{\cos Z \cos X + \sin Z \sin X}{\sin X} \sin D_S$

Simplifying (21)

(22) $\sin E_D = \left( \dfrac{\cos Z}{\tan X} + \sin Z \right) \sin D_S$

Substitute (1) in (22)

(23) $\sin E_D = \left( \dfrac{\cos Z}{\tan D_S} \sin E_V + \sin Z \right) \sin D_S$ Expanding (23)

(24) $\sin E_D = \cos Z \sin E_V \cos D_S + \sin Z \sin D_S$

Substituting (18) & (24) in (16)

$$(25) \quad \sin(E_V - E_D) = \frac{\sin E_V \cos E_V \cos D_S}{\cos D_D} -$$

$$\cos E_V \cos Z \sin E_V \cos D_S - \cos E_V \sin Z \sin D_S$$

Simplifying (25)

$$(26) \quad \sin(E_V - E_D) = \cos E_V \left( \frac{\sin E_V \cos D_S}{\cos D_D} - \right.$$

$$\left. \sin E_V \cos Z \cos D_S - \sin Z \sin D_S \right)$$

$$(27) \quad \sin(E_V - E_D) = \cos E_V \left[ \sin E_V \cos D_S \left( \frac{1}{\cos D_D} - \cos Z \right) - \sin Z \sin D_S \right]$$

$$(28) \quad \frac{1}{\cos D_D} = \sec D_D$$

Substituting (28) in (27)

$$(29) \quad \sin U_D = \sin(E_V - E_D) =$$
$$\cos E_V (\sin E_V \cos D_S (\sec D_D - \cos Z) - \sin Z \sin D_S)$$

Because the sines and tangents of small angles are approximately proportional to the angles and the cosine of a small angle is approximately unity equation (15) may be expressed as $$(30) \quad \tan D_D = \frac{1}{\cos E_V} (K Z \sin E_V + K_1 D_S)$$

and equation (29) may be expressed as $$(31) \quad U_D = E_V - E_D =$$
$$K_2 \cos E_V (K_3 \sin E_V (\sec D_D - K_3) - K_4 Z D_S)$$

It will be understood that the errors introduced by approximations in the foregoing derivation are negligible as far as the practical application of the equations to the system is concerned.

Figure 2:
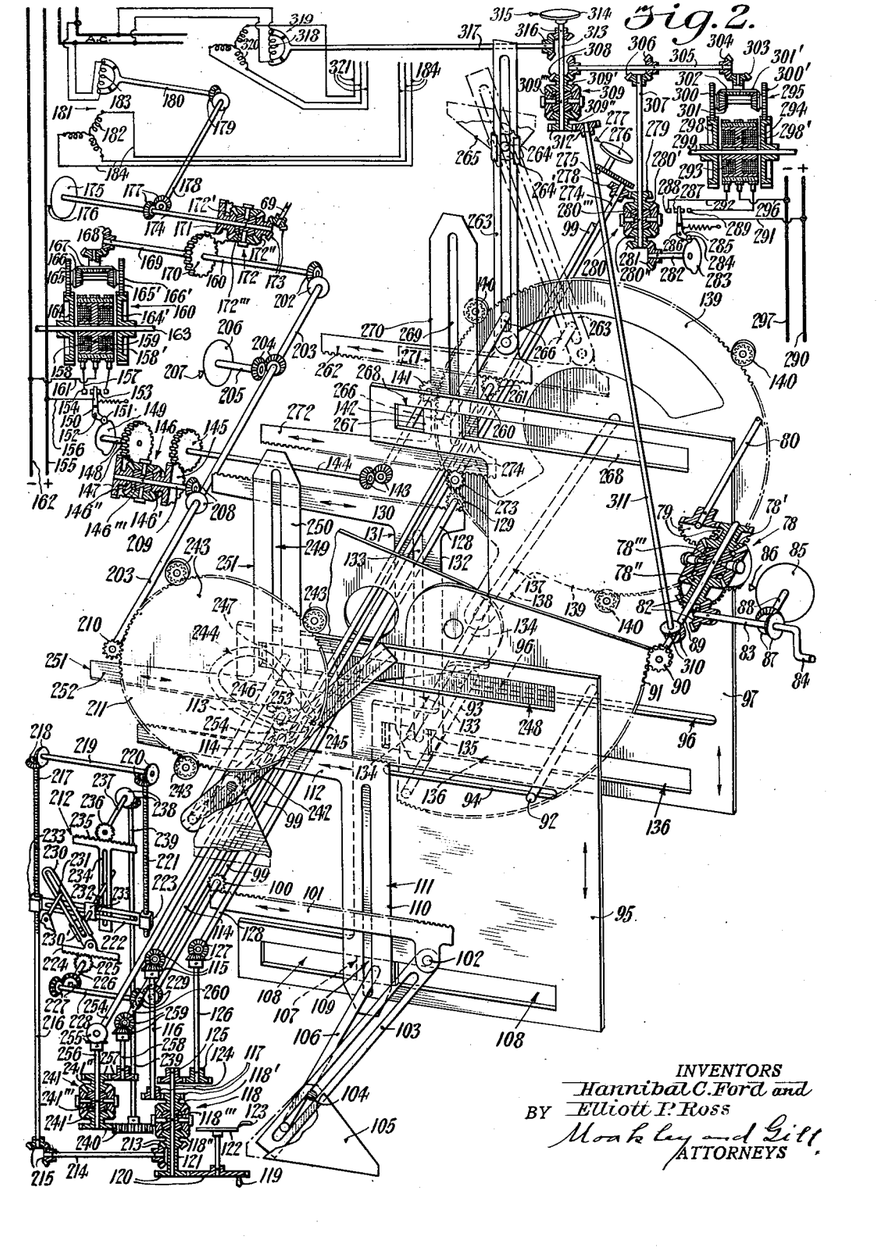
Fig. 2 is another diagrammatic perspective view of other portions of the system including a calculating instrument operable in conjunction with the director, and electrical transmission means from such instrument to the guns.

These equations are solved by the mechanism shown in Fig. 2 in which the elevation of the gun uncorrected for cross roll, which is designated as Ev, is obtained from the differential 78. One side 78' of this differential is operated by spur gears 79 one of which is mounted on a shaft 80, which shaft is continued from Fig. 1, where it is driven through bevel gears 81 from the shaft 72. It has already been shown that the shaft 72 is operated to represent the angle Es that exists in elevation between the deck and the line of sight, which angle is shown in Fig. 3. Accordingly, the shaft 80, shown in Figs. 1 and 2, acts through gears 79 to operate the side 78' of differential 78 proportionately to the magnitude of the angle Es.

Another side of 78'' of differential 78 is operated through bevel gears 82 from a shaft 83 that is actuated in any suitable manner, as by a crank handle 84, in accordance with the value of an angle Us, which is readable from a dial 85, against a pointer 86, the dial being operable from shaft 83 through bevel gears 87 and a shaft 88. The angle Us is the previously referred to deflection angle beginning at and extending above the line of sight, and it is due to the vertical component of the prediction of the target's future position at the point of burst of the shell, and also to ballistics. In Fig. 3, the angle Us is shown to include a vertical prediction angle UT and the superelevation angle e, and it is to be understood that correctional angles in elevation due to wind, etc., are included in the vertical deflection angle Us, the last named angle being the sight depression angle.

It will now be evident that the differential 78 adds the elevational angles Es and Us to obtain the angle Ev, which is the elevation of the gun above the deck uncorrected for cross roll. The center 78''' of differential 78 is, therefore, actuated in accordance with the value of the angle Ev, and being rigidly mounted on a shaft 89 turns the latter. A pinion 90 fast on shaft 89 drives the Ev sector 91, which is provided with two pins 92 and 93 projecting from opposite sides of the sector in reverse directions. The pin 92 enters a slot 94 in a sine slide 95, while the pin 93 projects into a slot 96 in a cosine slide 97. The Ev sector 91 thus actuates the sine and cosine slides 95 and 97, respectively, so that the former represents the sine of the angle Ev and the latter the cosine thereof. These and the other slides in the apparatus have their directions of movement indicated by arrows, and guides, while to be understood as being present, have been omitted to preserve the clearness of the drawings, such guides being of any well-known and suitable form.

As affecting the Ev sine slide 95, the operation of the cross level crank handle 42, shown in Fig. 1, establishes a drive through the shaft 43, a universal joint 98, a shaft 99 that extends into Fig. 2, and a pinion 100, shown in the lower left hand portion of that figure. The pinion 100 meshes with a rack on a slide 101, which is pivoted at 102 with the upper end of a slotted arm 103 that, for convenience, is termed the "Z arm", since it is actuated in accordance with the cross level angle Z, which the ship makes with the horizon when it cross rolls.

Projecting into the slot of the Z arm 103 from one side thereof is a stationary pin 104 that is fast on a fixed support 105, and, when the slide 101 moves to displace the upper end of the slotted Z arm 103, the latter swivels about the fixed pin 104, whereby the Z arm 103 acquires an inclination in accordance with the cross level angle Z made by the ship.

A pin 106 also enters the slot of the Z arm 103 in working relation to the walls thereof, but not deeply enough to encounter the fixed pin 104, which is similarly prevented from projecting into the path of the pin 106. At its other end, the pin 106 is rigidly fastened to a slide 107 that is displaceably mounted in a slot 108 in the lower portion of the Ev sine slide 95, this slot being arranged perpendicularly to the path of travel of the slide.

Upon movement of the Ev sector 91, the pin 92 rigid therewith moves the Ev sine slide 95 in one of the directions indicated by the double-headed arrow. The pin 106 travels with the Ev sine slide 95, but it is also laterally deflected due to its outer end lying in the slot of the Z arm 103, whereby the pin 106 is forced to move in the direction of such slot, the slide 107 permitting this by being displaced in the slot 108 of the sine slide 95. Thus, the setting of the Z arm 103 in accordance with the ship's cross roll angle Z and the movement of sine slide 95 proportionately to the sine of the angle Ev effects the multiplication of these quantities. That the resultant product may be available for use, the pin 106 also passes through the slot 109 in the vertical leg 110 of an inverted L-shaped slide 111. The horizontal leg 112 of the slide 111 is moved in one of the directions indicated by the double-headed arrow thereon by the same amount that the pin 106 and its supporting slide 107 are laterally deflected, in the manner set forth, which amount is proportional to the product of the cross level angle Z and the sine of the angle Ev. Hence, the movement of the horizontal leg 112 of slide 111 represents Z sin Ev.

Operation of the Z sin Ev slide 111 results in the rack of its horizontal leg 112 turning a pinion 113 on a shaft 114. In the lower left hand corner of Fig. 2, the shaft 114 is seen to drive bevel gears 115, a shaft 116 and spur gears 117 one of which is rigid with a side 118' of a differential 118. The measure of lateral sight deflection Ds is carried to this differential in any suitable manner, which, for convenience, has been shown to be through turning a handle 119, so turning spur gears 120 one of which is rigidly connected through a sleeve 121 with another side 118'' of the differential 118. The value of the lateral sight deflection Ds is read on a dial 122 against a pointer 123. The differential 118, therefore, algebraically adds the lateral sight deflection Ds and the value $K Z \sin Ev$, which results in the center 118''' of differential being turned proportionately to the value of $KZ \sin Ev + K_1 Ds$. The differential center 118''' is fast upon and turns a shaft 124, so setting up a drive through spur gears 125, a shaft 126, bevel gears 127 and a shaft 128 that at its other end carries a pinion 129. This pinion is in mesh with a rack on the horizontal leg 130 of a slide 131. Thus, the slide 131 is moved, in one of the directions indicated by the double-headed arrow thereon, in accordance with the value of $K Z \sin Ev + K_1 Ds$.

The vertical leg 132 of the slide 131 is provided with a slot 133 through which a pin 134 passes. This pin is fixedly secured to a slide 135 that is displaceably mounted in the lower horizontal slot 136 of the Ev cosine slide 97. At its opposite end the pin 134 projects into a slot 137 of a "tangent arm" 138, which is shown as being integrally formed with a circular member 139 more specifically referred to later. The slide 131 being horizontally moved to represent the value of $K Z \sin Ev + K_1 Ds$, the slide 135 and its pin 134 will be correspondingly displaced to also represent $K Z \sin Ev + K_1 Ds$. The hereinbefore referred to actuation of the Ev sector 91 results in the pin 93 carried thereby acting upon the wall of the slot 96 in the Ev cosine slide 97 to vertically displace such slide. As the slide 135 is mounted in the slot 136 of the Ev cosine slide 97, the pin 134 is also moved vertically. The horizontal displacement of the pin 134 due to the displacement of the slide in accordance with the value of $K Z \sin Ev + K_1 Ds$ is accordingly modified by its movement in response to the Ev cosine slide 97, whereby $K Z \sin Ev + K_1 Ds$ becomes multiplied by $$\frac{1}{\cosine\ E_V},$$

i. e., the pin 134 becomes set so that it represents $$\tan D_D = \frac{1}{\cos E_V}(KZ \sin E_V + K_1 D_S).$$

The tangent arm 138 being integral with the circular member 139, which is known as the $D_D$ sector, turns the latter by an amount which represents the angle whose tangent is, $$\tan D_D = \frac{1}{\cos E_V}(KZ \sin E_V + K_1 D_S).$$

Rollers 140, at, say 120° apart mount the $D_D$ sector 139 for rotary movement.

A pinion 141 is turned by rotary movement of the $D_D$ sector 139, and so drives proportionately to the angle $D_D$ through a shaft 142, bevel gears 143, a shaft 144 and spur gears 145 to turn one side 146' of a differential 146 in accordance with the angle $D_D$. The center 146''' of differential 146 being stationary at such time, the gears of the differential center 146''' will be turned by those of differential side 146' thereby turning the side 146'' of the differential. Spur gears 147, one of which is rigidly combined with differential side 146'', are thus driven to turn a shaft 148 and a cam 149. This cam has a periphery formed to have two dwells of different radii and two sloping surfaces connecting the adjacent ends of the dwells. A bent double-arm lever 150 carries a roller 151 at the end of one of its arms, and, when this roller rests on one of the sloping cam surfaces intermediate the dwells of greater and lesser radii, the lever 150 is in its neutral position, as shown in Fig. 2.

Under the described conditions, the cam 149 is being turned proportionately to the value of the angle $D_D$, and the roller 151 will co-act with one of the dwells on the cam's periphery, say that of larger radius, the lever 150 turning sufficiently on its fulcrum 152 so that an insulated movable contact 153 carried by the other arm of lever 150 engages a fixed contact 154. Such engagement will be made when the angle $D_D$ is changing in a given direction, say, when it is increasing.

As a result, current will flow from a positive line conductor 155 by a conductor 156 to the insulated end of the arm of lever 150 that carries the movable contact 153, thence passing to fixed contact 154 and going by a conductor 157 to a magnet coil 158 that is inset in a cup-like cavity of an iron core 159 of a double electro-magnet forming part of a clutch 160 known as the $D_D$ clutch. From coil 158 the current returns by a conductor 161 to the negative line conductor 162.

The magnet core 159 is keyed to a power-driven shaft 163, whereby the double electro-magnet is turned with it. Energization of the magnet coil 158 attracts an armature, which is shown, for convenience, as a spur gear 164 of ferrous material. Spur gear 164 is accordingly driven with the double electro-magnet and drives another spur gear 165 with which a bevel gear 166 is compounded. Driven by the bevel gear 166 is another bevel gear 167 and a further pair of bevel gears 168 connected therewith. One of the bevel gears 168 is fast on a shaft 169, which also carries a spur gear 170 that meshes with another spur gear 171 that is rigid with and actuates one side 172' of a differential 172.

The shaft 169 also drives bevel gears 202, so turning a shaft 203, bevel gears 204, a shaft 205 and a deflection dial 206, which reads against a pointer 207 to show the value of the deflection angle $D_D$ in the plane of the deck.

In addition, the shaft 203 extends to other bevel gears 208, one of which is fast on the shaft 209 on which the differential center 146''' is also secured. Therefore, the $D_D$ clutch 160 causes the differential center 146''' to turn, whereupon the latter acts upon the differential side 146'' to cause the gears 147 and the shaft 148 to turn the cam 149 to return the double-arm lever 150 and its movable contact to their neutral positions. This stops the operation of the $D_D$ clutch 160 when such operation balances the calculated lateral deflection angle $D_D$ in the plane of the deck, as it is applied to the side 146' of the differential 146, in the manner already set forth. If the angle $D_D$ changes in the opposite direction another magnet coil 158' is energized instead of magnet coil 158, and another armature-gear 164' is driven and drives other gears 165' and 166' to rotate the gear 167 in the direction that is reversed to that previously referred to. The elements that are responsive to the drive from gear 167 are accordingly driven reversely to their previous directions, thereby conforming to the reversed evaluation of the angle $D_D$.

The shaft 203 also carries a pinion 210 which is in mesh with the secant cam 211 of the cross levelling corrector, which will be referred to more fully hereinafter.

It was previously shown, in connection with the description of the director shown in Fig. 1, that the shaft 69 is operated proportionately to the director train $B_S$. Shaft 69 is continued in Fig. 2, in the upper left hand portion thereof, where it is connected through bevel gears 173 with a side 172'' of differential 172 to operate that side proportionately to $B_S$. Consequently the differential 172 adds the director train $B_S$ and the target's deflection angle $D_D$ in the plane of the deck, the center 172''' of differential 172 being actuated in accordance with such sum by the differential sides 172'' and 172', which are respectively actuated according to the angles $B_S$ and $D_D$, as already shown. A shaft 174 on which the differential center 172'' is rigidly mounted is accordingly turned proportionately to the sum of the angles $B_S$ and $D_D$, which sum is the gun train $B_D$ for the predicted position of the target, and is readable on a dial 175 against a pointer 176 the dial being mounted on shaft 174.

A pair of bevel gears 177 connects shaft 174 with a shaft 178, the latter turning bevel gears 179 to actuate a shaft 180 and a gun train transmitter 181. This transmitter may be of any suitable type, and is shown as comprising a stator 182 and a rotor 183. Certain points of the winding of the transmitter stator 182 are connected by conductors 184 with corresponding points of a similar winding of a stator 185 of a gun train indicator 186 shown in Fig. 8. In consequence of the electrical connections between the gun train transmitter 181 and gun train indicator 186, a rotor 187 of the gun train indicator 186 seeks to adjust its position with respect to its associated stator 185 in correspondence with the relation of the stator 182 and rotor 183 of the gun train transmitter 181. The rotor shaft 188 of the gun train indicator 186 has a pointer 189 mounted upon it, which pointer is thrown off by the angular displacement of the rotor 187 and its shaft 188 as the former moves to a position with respect to its stator 185 that reproduces the set up relationship of the stator and rotor 182 and 183 of the gun train transmitter 181. The pointer is insulated and serves as a movable contact that will engage one or the other of a pair of fixed contacts 190, according to whether the gun train is increasing or decreasing in value.

Figure 8:
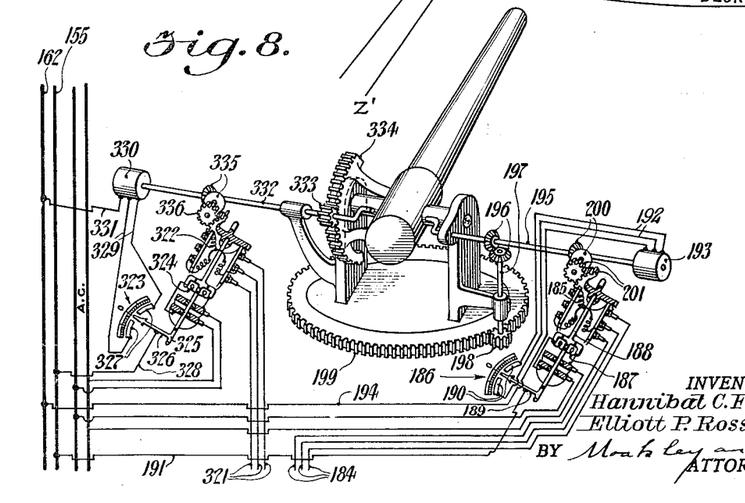
Fig. 8 shows a gun with the controlling instruments which are responsive to the transmission means at the calculating instrument.

Assuming that pointer 189 engages the left hand contact 190, current will flow from the positive line conductor 155 by a conductor 191 to the gun train indicator pointer 189, to the left hand fixed contact 190, then going by a conductor 192 to a motor 193, returning therefrom by a conductor 194 to the negative line conductor 162. The motor 193 thereupon operates in one direction to drive through a shaft 195, bevel gears 196, a shaft 197 and a pinion 198 to train the gun in accordance with the transmitted value of gun train $B_D$, relative to the annular gun train rack 199.

Simultaneously, the motor shaft 195 also drives through bevel gears 200, a shaft and spur gears 201 to adjust the stator 185 as the gun train is being set. The rotor 187 of the gun train indicator in maintaining the transmitted relation with its stator 185 turns with the stator, thus turning its shaft 188 and the pointer 189 until the latter is opposite the zero mark. The gun train indicator 186 being a zero reading instrument, shows a zero reading when the gun has acquired the transmitted gun train. Were the gun train to be in the opposite direction to that described, the pointer 189 of the gun train indicator 186 would engage the right hand fixed contact 190, and through connections similar to those already described effect a reversed operation of the motor 193 and the elements under its control.

The means for obtaining the angle $U_D$ which is the angle of correction in elevation due to cross levelling and lateral deflection, will now be described.

For determining the value of the angle $U_D$ the following already derived formula is employed.

$$U_D = K_2 \cos E_V (K_3 \sin E_V (\sec D_D - K_3) - K_4 Z D_S).$$

A calculation of the quantity $K_4 Z D_S$ is made by an angle multiplier 212 shown in the lower left hand portion of Fig. 2. It has already been shown that the handle 119 is operated in accordance with the sight deflection $D_S$ in the plane of sight, which quantity is carried by gears 120, sleeve 121 and one side 118'' of differential 118, the sleeve 121 being rigid with one of the gears 120 and the differential side 118''. Also rigid with the sleeve 121 is one of a pair of bevel gears 213, the other of which gears is fast on a shaft 214, which is consequently driven proportionately to the value of the quantity $D_S$. The shaft 214 thus drives bevel gears 215, a shaft 216 which has a threaded portion 217, bevel gears 218, a shaft 219, other bevel gears 220 and a threaded shaft 221 similar to the threaded portion 217 of shaft 216. Spanning the space between the latter and threaded shaft 221 is a slotted bar 222, the termini of which constitute travelling nuts 223 through which the threaded shafts 217 and 221 are screwed. The actuation of these threaded shafts, vertically displaces the bar 222 proportionately to the value of the lateral deflection angle $D_S$ in the plane of sight. A rack 224 of the angle multiplier is driven by a pinion 225 on shaft 226 that in turn is driven from bevel gears 227, which are actuated by a shaft 228 that is driven by bevel gears 229 from shaft 99. It was previously shown that the shaft 99 was operated proportionately to the value of the cross level angle $Z$. Displacement of rack 224 by pinion 225 gives a slotted arm 230 a consequent inclination, a stationary pin 231 projecting into the slot of arm 230, so that the latter swivels about this pin as its lower end is displaced by rack 224. It is thus apparent that, as the bar 222 is vertically displaced, as described, a pin 232 that projects from a carriage 233 that is slidable on the bar 222 and is connected to a slide 230' on arm 230 must travel parallel to the direction of the slot in arm 230. The pin 232 also enters a slot in the vertical leg 234 of a T-shaped slide, which is also provided with a rack 235. The movement of the T-shaped slide and its rack 235 is proportional to the product of the values of the lateral deflection angle $D_S$ and the cross level angle $Z$. Therefore, the output of the angle multiplier is equal to $Z D_S$, which value is transmitted from rack 235, by a pinion 236, a shaft 237, bevel gears 238, a shaft 239 and spur gears 240 to one side 241' of a differential 241. Proper proportioning of the involved gearing introduces the quantity $K_4$ as a factor whereby the quantity delivered to differential side 241' equals $K_4 ZDs$.

Another quantity of the formula, i. e., sec $D_D-K_3$, is calculated by the secant cam 211 and the secant arm 242. As already shown, the secant cam 211 is driven from the $D_D$ clutch 160, and its angular position represents the lateral deflection angle $D_D$ from the axis Z' in the plane of the deck, the axis Z' being that of the cross level angle Z. The periphery of the secant cam 211 is toothed for co-action with the pinion 210, and also engages with annularly disposed supporting idlers 243, which sustain the secant cam 211. The secant cam is provided with a cam groove 244 that is plotted from a secant curve. On the ungrooved side of the secant arm 242 is mounted a roller 245 that enters the groove 244 of the secant cam 211 and is in the nature of a cam follower. The secant arm 242 is actuated by the cam follower or roller 245 which it carries and which is, as stated, responsive to the secant cam 211, whereby the cam folower is made to represent sec $D_D-K_3$.

On its side that is reversed to that carrying the roller 245, the secant arm 242 is grooved and into such groove a pin 246 projects, this pin being carried by a slide 247 that is displaceably mounted in a horizontal slot 248 in the upper portion of the $E_V$ sine slide 95. With this arrangement, the interaction of the secant arm 242 and the $E_V$ sine slide 95 effects the multiplication of sec $D_D-K_3$ by $K_3 \sin E_V$, the resultant product being $K_3 \sin E_V (\sec D_D-K_3)$. The pin 246 also passes through the slot 249 in the vertical leg 250 of a slide 251, the horizontal leg 252 of which is provided with a rack that drives a pinion 253 on a shaft 254 which drives through bevel gears 255 and a shaft 256 to operate the center 241''' of differential 241. Thus, the differential center 241''' is operated in accordance with the quantity $K_3 \sin E_V (\sec D_D-K_3)$ from which the differential side 241' subtracts $K_4 ZDs$, thus of the formula for the angle $U_D$, we now have provided means to evaluate that much of it as reads: $(K_3 \sin E_V (\sec D_D-K_3) - K_4 ZDs)$, and the differential side 241'' is operated proportionately thereto.

Through spur gears 257, one of which is rigidly combined with the differential side 241'', a drive in accordance with $(K_3 \sin E_V (\sec D_D-K_3) - K_4 Z Ds)$ is established through a shaft 258, bevel gears 259 and shaft 260, which extends upward and toward the right in Fig. 2, to a pinion 261. This pinion meshes with a rack on a horizontal slide 262, which is consequently displaced proportionately to $(K_3 \sin E_V (\sec D_D-K_3) - K_4 Z Ds)$, and correspondingly displaces the lower end of a slotted arm 263 that is pivotally connected to it. Upon such occurrence, the arm 263 swivels about a fixed pin 264 mounted on a stationary support 265, a carriage 264' being slidable on arm 263 and pivoted on pin 264.

Projecting into the slot of arm 263 is a pin 266, the other end of which is rigidly mounted on a slide 267 in a slot 268 in the upper portion of the $E_V$ cosine slide 97. As the slide 262 is displaced, as described, the slotted arm 263 acquires an inclination, such as is indicated in dot and dash lines. Vertical movement of the $E_V$ cosine slide 97 causes the pin 266 to travel in the slot of arm 263 parallel thereto, the slide 267 changing its position in slot 268. Since the pin 266 also passes through the slot 269 in the vertical leg 270 of a horizontally displaceable slide 271, the horizontal leg 272 is displaced in one of the directions indicated by the double-headed arrow thereon. In this manner the slide 262 is set proportionately to the value of $(K_3 \sin E_V (\sec D_D-K_3) - K_4 Z Ds)$, and the described movement of the $E_V$ cosine slide 97 multiplies this value by $K_2 \cos E_V$, the value $K_2$ being introduced by the proper proportioning of the associated gearing. Thus, actuations have been shown to be provided for the complete formula for $U_D$, which as stated is:

$$U_D = K_2 \cos E_V (K_3 \sin E_V (\sec D_D-K_3) - K_4 Z Ds).$$

The horizontal leg 272 of slide 271 is consequently operated in accordance with the value of the angle $U_D$ which is the angle of correction in elevation due to cross roll of own ship. Meshing with a rack on the horizontal leg 272 of slide 271 is a pinion 273 that turns a shaft 274, which at its other end drives through gears 275 to turn a dial 276 that reads against a pointer 277 to show the value of the angle $U_D$. Also fast on shaft 274 is a bevel gear 278 that meshes with another bevel gear 279 that is rigid with one side 280' of a differential 280, thus actuating that side proportionately to the value of the elevation correction angle $U_D$. As the shaft 274 turns, the differential side 280' is turned, and, with the center 280''' of differential 280 stationary, the gears of such differential center turn, so actuating the side 280'' of the differential. Operable with the differential side 280'' are a pair of bevel gears 281, a shaft 282 and a cam 283, which is formed similarly to the already described cam 149.

According to whether the value of the angle $U_D$ is increasing or decreasing, the cam 283 acts on a roller 284 that is carried by a double-arm lever 285 to turn it about its fulcrum 286, so that a movable contact 287 at its other, insulated, end will be thrown into engagement with one of a pair of fixed contacts 288 or 289, say contact 288. Thereupon, current will flow from a positive line conductor 290 by a conductor 291 to the insulated end of lever 285 and movable contact 287 to the fixed contact 288. From here the current goes by a conductor 292 to a magnet coil 293 inset in a cup-like cavity in an iron core 294 of a $U_D$ clutch 295. From the magnet coil 293 the current returns by a conductor 296 to the negative line conductor 297.

Energization of the magnet coil 293 causes the attraction to the magnet core 294 of a ferreous spur gear 298, which serves as one of the armatures of the double electro-magnet $U_D$ clutch 295. The iron core 294 is keyed to a power-driven shaft 299, so that the double electro-magnet of the $U_D$ clutch 295 is constantly revolved, and when attracted to the iron core 294, as described, the ferreous spur gear 298 is also rotated. Driven from the gear 298 is another spur gear 300 compounded with which is a bevel gear 301, which drives another bevel gear 302 that is rigidly combined with still another bevel gear 303 that drives a further bevel gear 304, a shaft 305 and a pair of bevel gears 306, one of which is fast on a shaft 307 on which the differential center 280''' is rigidly mounted. Hence, the differential center 280''' is operated from the $U_D$ clutch 295 until its actuation balances that of the differential side 280' proportionately to the $U_D$ angle previously referred to. In so turning, the differential center 280''' drives the differential side 280'', bevel gears 281, shaft 282 and cam 283, until the cam moves the double-arm lever and its contact 287 to their neutral positions by a degree of operation that balances that of the differential side 280'. The resultant opening of the circuit de-energizes magnet coil 293, whereupon the gear 298 is no longer attracted to be driven with and by the rotating double electro-magnet. In case the $U_D$ angle varies in the opposite sense to that referred to, an armature-gear 298' and other gears 300' and 301' in a gear train on the opposite side of the double electromagnet become effective and drive gear 302 and the elements controlled thereby similarly to the mode already described, but in the reverse direction.

During the operation of the $U_D$ clutch 295 in the manner set forth, the shaft 305 also turns bevel gears 308, one of which is operable with one side 309' of a differential 309 in accordance with the value of the angle $U_D$. It is to be remembered that the center 78''' of differential 78 is operated to represent the angle $E_V$, shown in Figs. 3 and 4 to be the angle of the axis of the bore of the gun uncorrected for cross level, above the deck, and that the angle $E_V$ is composed of the angle $E_S$ of the line of sight above the deck and the angle $U_S$, which is the vertical deflection angle $U_T$ plus the superelevation angle $e$ and other ballistic angles that for the sake of simplicity have been omitted in the drawings. Differential center 78''', therefore, turns the shaft 89 proportionately to the value of the angle $E_V$, shaft 89 driving through bevel gears 310, a shaft 311 and gears 312 to turn the side 309'' of differential 309 to represent the angle $E_V$. It thus becomes evident that the differential sides 309'' and 309' algebraically combine the angles $E_V$ and $U_D$. Accordingly, the differential center 309''' turns a shaft 313, upon which it is fast, by an amount equal to $E_V$-$U_D$.

The shaft 313, carries a dial 314 that reads against a pointer 315 to give a reading of the gun elevation $E_D$ that is to be transmitted to the gun or guns. This value is also carried through bevel gears 316 and a shaft 317 to the rotor 318 of a gun elevation transmitter 319. The stator 320 of the gun elevation transmitter has certain points of its winding connected by conductors 321 to similar points of the winding of the stator 322 of a gun elevation indicator 323 (Fig. 8).

The self-synchronous character of the gun elevation indicator causes its stator 322 and rotor 324 to assume mutual relations corresponding to those set up between the rotor 318 and stator 320 of the gun elevation transmitter 319, similarly to the case of the gun train transmission system. As the gun elevation indicator rotor 324 turns off, it turns its shaft 325 and a pointer 326 carried thereby, so that the insulated pointer engages either of a pair of fixed contacts 327, according to whether the gun elevation angle is increasing or decreasing. In consequence, current flows from the positive line conductor 155 by a conductor 328 to the gun elevation indicator pointer 326, to, say, the left hand fixed contact 327, proceeding by a conductor 329 to a motor 330, returning therefrom by a conductor 331 to the negative line conductor 162.

The resultant operation of motor 330 drives a shaft 332 and a pinion 333, which in turn drives the gun elevation rack or sector 334. At the same time, the shaft 332 also drives through bevel gears 335 and spur gears 336 to adjust the stator 322 of the gun elevation, indicator in correspondence with the setting of the gun. This causes the gun elevation indicator rotor 324 to follow its stator, so that the rotor shaft 325 and the pointer 326 are returned to their neutral positions, when the movement of the gun in elevation is stopped as the pointer 326 moves off the left hand fixed contact 327 to its zero position. The gun elevation indicator is thus seen to be a zero-reading instrument. Had conditions required a change of elevation of the gun in the opposite direction to that described, the pointer 326 would have engaged the right hand contact 327, when the motor 330 would have been operated in the reverse direction through the shown circuits, which are similar to those described.

While the stabilizing system of the director has been described above as being operated and its outputs transmitted to the calculating instrument by manually operable means, the invention also provides for the performance of these functions by automatic means. To accomplish this a gyroscope 337 is mounted upon trunnions 338 within an inner gimbal ring 339 supported by trunnions 340 on the gimbal ring 12. Mounted upon the gyroscope but insulated therefrom is a trolley 341 preferably in line with the trunnions 340 and coacting with a pair of contacts 342 and 342' mounted upon and insulated from the inner gimbal ring 339, the contacts being separated by insulation as indicated. The trolley is connected by a conductor 343 to the positive main 155. The contacts 342 and 342' are connected by conductors 344 and 345 respectively to the reversely wound field windings of a motor 346. A conductor 347 common to both windings of the motor leads to the negative main 162. The shaft of the motor is provided with a gear 348 meshing with gear 71 which is connected to the side 65'' of differential 65.

In the operation of these elements of the apparatus the gyroscope due to the fixity of its plane of rotation remains horizontal while the gimbal ring 339 within which it is mounted tends to move with the ship through the levelling angle L. This results in a displacement of the trolley 341 from its normal position upon the insulation separating the contacts 342 and 342' into engagement with one or the other of these contacts, thus establishing a circuit through one or the other of the fields of the motor 346 through conductor 343, contact 342, conductor 344, conductor 347 on the one hand or conductor 343, contact 342', conductor 345 and conductor 347 on the other hand. The armature of the motor being suitably energized rotates and drives through gears 348 and 71 the side 65'' of the differential 65. At the same time through gear 70, shaft 60, bevel gears 59, shaft 39a, gears 39b, shaft 39c, shaft 39d, the worm 40 will be driven from the motor to tilt the gimbal rings 12 and 339 in a direction opposite to that in which they tend to move by the roll and/or pitch of the ship. This movement of the gimbal rings will continue until the contacts 342 and 342' are restored to their normal position with the trolley 341 engaging the insulation between them. The trolley, contacts and motor thus constitute a follow-up system by which the gimbal rings 12 and 339 are by a series of steps as described above maintained horizontal about the trunnions 13 and the side 65'' of the differential 65 is driven according to values of the levelling angle L, so that the shaft 72 turns proportonately to the values of the angle $E_S$, as it does in the case of manual operation, to transmit these values to the calculating mechanism through the shaft 80.

For automatically transmitting to the calculating mechanism the values of the cross levelling angle Z a similar arrangement is employed. This consists of a trolley 349 mounted upon the gimbal ring 339 preferably in line with the trunnions 13—13 and coacting with contacts 350 and 350' mounted upon the standard 15 and insulated from each other and the standard. The trolley 349 is connected by a conductor 351 to the positive main 155. The contacts 350 and 350' are connected by conductors 352 and 353 respectively to the reversely wound field windings of a motor 354 having a common connection 355 to the negative main 162. The motor is connected by gears 356 to shaft 43.

Due to roll and/or pitch of the ship the gimbal rings 10 and 12 tend to move with the ship while the gimbal ring 339 is stabilized by the gyroscope. The trolley 349 will thus be shifted on to one or the other of the contacts 350 or 350' to establish a circuit to one of the field windings of the motor 354 to drive shaft 43. At the same time the worm 45 will drive the sector 46 in a direction to restore gimbal rings 10 and 12 to a position parallel to the plane of rotation of the gyroscope, thus providing a follow-up arrangement by which the rings 10 and 12 are stabilized with respect to the roll and/or pitch of the ship and the values of the cross levelling angle Z are automatically transmitted to the calculating instrument by the shaft 99.

Due to a variety of causes gyroscopes are subject to straying or wandering from their true positions with their spinning axes fixed in space. The levelling telescope 34 and the cross levelling telescope 36, by virtue of the follow-up mechanism and gimbal rings, will be maintained parallel to the plane of rotation of the gyroscope and any displacement or straying of the gyroscope from its true position will be manifest to either or both of the observers using telescopes 34 and 36 by deviations of the images of the horizon from the cross wires of the telescopes. The gyrocope may then be restored to its normal position by applying pressure to it to cause it to precess until the images of the horizon coincide with the cross wires of the telescopes, since the telescope will follow the precessional movements of the gyroscope by virtue of the follow-up arrangements.

When occasion arises to employ the apparatus against a surface target, the altitude sight angle A will become zero, otherwise the operation will continue as previously set forth in connection with aerial targets.

While a preferred embodiment of the invention has been shown and described, it will be understood that the invention may be embodied in other forms and that various changes may be made in the details of the apparatus without departing from the principle of the invention as defined in the appended claims.

We claim:

1. In a fire control system for ordnance mounted on an unstable platform, the combination of a director, means for eliminating the effect on the line of sight of the director of angular movements of the platform in the vertical plane of the line of sight and in a vertical plane at right angles thereto, whereby the operation of following a target in train and elevation may be performed as if the director were mounted upon a stable platform, means for introducing angular displacements of a gun from the line of sight, and means operable by both said means for calculating and applying to the gun the train and elevation necessary to preserve its aim in spite of the angular movements of the platform.

2. In a fire control system for ordnance mounted on an unstable platform, the combination of a director, means for eliminating the effect on the line of sight of the director of angular movement of the platform about an axis lying in the vertical plane of the line of sight, means for introducing angular displacements of a gun from the line of sight and means operable by both of said means for calculating and applying to the gun the train and elevation necessary to preserve its aim in spite of such angular movement of the platform.

3. In a fire control system for ordnance mounted on an unstable platform, the combination of a director, means for eliminating the effect on the line of sight of the director of angular movement of the platform in the vertical plane of the line of sight and in a vertical plane at right angles thereto, whereby the operation of following a target in train and elevation may be performed as if the director were mounted upon a stable platform, means to introduce angular displacements of a gun relative to the line of sight, means for measuring the displacement of the platform from a fixed plane, means operable from the last two means for computing the train and elevation of the gun relative to the platform to substantially maintain the angular displacements of the gun relative to the line of sight, and means to direct the gun to the computed train and elevation.

4. In a fire control system for ordnance mounted on an unstable platform, a frame, means for rotating the frame about an axis fixed relative to the platform, a member mounted on the frame, means for maintaining the member in a fixed plane, a sight, means for adjusting the sight in a plane fixed relative to the member, means for introducing angular displacements of a gun relative to the line of sight, means for computing the relation of the gun in train and elevation to the platform to substantially maintain the angular displacements of the gun relative to the line of sight, and means to direct the gun to the computed train and elevation.

5. In a fire control system for ordnance mounted on an unstable platform, the combination of a rotatable support, a member movably mounted on the support, means for maintaining the member in a predetermined plane irrespective of the angular movement of the platform, a sighting device mounted on and adjustable relative to the member, a computing mechanism having parts actuated in accordance with the relative displacement between the member and the platform, a part actuated in accordance with the train angle of the support, a part actuated in accordance with the elevation angle of the line of sight, and parts actuated in accordance with correctional displacements of a gun from the line of sight, means actuated by said parts for computing the relation of the gun to the platform in train and elevation to substantially maintain the angular displacement of the gun relative to the line of sight and means actuated by said computing means to direct the gun to the computed train and elevation.

6. In a fire control system for ordnance mounted on an unstable platform, the combination of a director, a computing mechanism, means for actuating a part of the mechanism in accordance with the angular displacement of the platform about an axis in the vertical plane of the line of sight to a target, means for actuating a second part of the mechanism in accordance with the angular displacement of the platform about an axis at right angles to the vertical plane of the line of sight, means for actuating a third part of the mechanism in accordance with the train angle of the director relative to the platform, means for actuating a fourth part of the mechanism in accordance with the elevation angle of the line of sight, means for actuating a fifth part of the mechanism in accordance with the required vertical displacement of a gun from the line of sight, means for actuating a sixth part of the mechanism in accordance with the required horizontal displacement of a gun from the line of sight, means actuated by said parts for computing the relation of the gun to the platform in train and elevation to substantially maintain the angular displacements of the gun relative to the line of sight and means actuated by the computing means to direct the gun to the computed train and elevation.

7. In a stabilizing system for use on an unstable platform, means for measuring the displacement of the platform from a fixed plane, means for introducing the position of a reference axis relative to the fixed plane, mechanism operable by both said means for maintaining an axis mounted on the unstable platform parallel to the reference axis, and other mechanism operable by said means for maintaining a second axis mounted on the unstable platform at fixed angular displacements from the reference axis.

8. In a fire control system for ordnance mounted on an unstable platform, a director, a gun, means for introducing the desired train and elevation of the line of sight of the director relative to fixed planes, means for measuring the displacement of the platform from one of the fixed planes, mechanism operable from said means to maintain the line of sight in the desired direction, means for introducing displacements of a gun from the line of sight, mechanism for computing the train and elevation of the gun relative to the unstable platform to maintain it at the desired displacements from the line of sight and means to direct the gun to the computed train and elevation.

9. In a fire control system for use upon a support having a reference plane and subject to oscillatory displacement, a plurality of co-operative elements operable in accordance with the oscillatory movement of the support to establish a stable plane, a sighting device arranged to be set with reference to such plane, and means for establishing the angle of the line of sight from the reference plane.

10. In a fire control system for use upon a support having a reference plane and subject to oscillatory displacement, a gun, a plurality of elements in part operable reversely to the direction of the reference plane's oscillatory displacement to establish a stable plane of reference, a device arranged to angularly refer a line of sight to the stable plane, and means to combine the measures of the angle of the line of sight, the angles of the reference plane's oscillatory displacement and deflection angles to establish the angle of the line of fire of the gun from the reference plane.

11. In a fire control system for use upon a craft subject to roll and cross roll, means to maintain lines of sight and fire to a target irrespective of such motions of the craft, comprising means to determine the angle of fire, a device operable according to functions of the angle of fire, means for measuring the roll and cross roll of the craft, and means responsive to said last named means and said device to determine the angles of fire relative to the craft.

12. In a fire control system for use on a platform subject to oscillatory displacement and provided with a gun, means to establish a fixed plane of reference, a sighting device, means to cause the line of sight to the target to be related to the reference plane proportionately to the altitude angle of the target, means to train said sight on the target, means operable in accordance with the angles of displacement of the platform, means to introduce deflection angles and means operable to combine the altitude angle, the angles of displacement and the deflection angles in a manner to maintain the line of sight on the target and the gun at the deflection angles from the line of sight to the target.

13. In a fire control apparatus for use on a platform subject to angular displacement and having a gun mounted thereon, a plurality of elements in part operable reversely to the direction of the angular displacement to establish a stable plane of reference, a device operable to establish the angle of the line of sight to a target with respect to the reference plane, means for referring the line of sight to the part of the platform on which the gun is mounted, means operable in accordance with a vertical deflection angle, means for computing the correction in elevation due to displacement of the platform, and mechanism for combining the values of all of said means to establish an angle of elevation for the gun.

14. In a fire control system for use on a platform subject to oscillatory displacement, means to maintain lines of sight and fire to a target irrespective of the motion of the platform comprising means for establishing the angles of bearing and deflection and for determining the angle of fire, a device operable according to functions of the angle of fire, mechanism for measuring the displacement of the platform, computing means responsive to said device and mechanism to determine the angle of correction due to the displacement and means to determine the angle of required gun train.

15. In a fire control system for use on a platform subject to oscillatory displacement, means to measure the elevation angle of the line of fire to a target, means to measure the lateral deflection of the target in the plane of sight, means to determine the value of the target's angle of deflection in the plane of gun train, devices respectively operable according to the sine and the cosine of the angle of fire, a second device operable responsively to the means for determining the target's deflection in the plane of gun train and proportionately to the secant thereof, means responsive to the action of said devices to multiply the secant of the deflection angle in the plane of gun train and the sine of the angle of fire, means to measure the angle of cross roll of the platform, a multiplier to effect the product of the angle of cross roll and the lateral deflection of the target in the plane of the line of sight, means for combining the last named product with the product of the secant of the deflection angle in the plane of gun train and the sine of the angle of fire, and means for multiplying the result by the cosine of the angle of fire.

16. In a fire control system for use on a platform subject to oscillatory displacement, means operable in accordance with the value of the elevation angle of the line of fire, devices respectively operable according to the sine and cosine of the elevation angle of the line of fire, means for multiplying such sine and cosine by averaging constants, measuring means to evaluate the angle of cross roll of the platform, means to multiply such cross roll angle by a modifying constant, measuring means operable according to the target's deflection in the plane of sight, mechanism to determine the secant of the angle of the target's deflection in the plane of gun train, means to combine a modifying constant with such secant, a multiplier effecting the product of the modified sine of the elevation angle of the line of fire and the modified secant of the angle of the target's deflection in the plane of gun train, another multiplier for securing the product of the modified value of cross roll of the platform and the target's deflection in the plane of sight, means to combine the last named product from the product last preceding it, and means to multiply the resulting remainder by the modified value of the cosine of the elevation angle of the line of fire.

17. In a fire control instrument, the combination of a support, an optical element movably mounted on the support, a frame mounted on the support about an axis parallel to the horizontal component of the line of sight of the element, means for moving the frame about its axis, a gyroscope mounted within the frame upon an axis parallel to the axis of the frame and upon an axis perpendicular to the first named supporting axis, means actuated by relative movement between the frame and the gyroscope about the axis of the frame for controlling the moving means for maintaining the frame in predetermined relation to the gyroscope, means for moving the optical element with respect to the support and means actuated by relative movement between the gyroscope and the frame about an axis at right angles to the axis of the frame for controlling the last named moving means to maintain the optical element in predetermined relation to the gyroscope.

18. In a fire control instrument, the combination of a support, an optical element movably mounted on the support, a frame mounted on the support about an axis parallel to the horizontal component of the line of sight of the element, a gyroscope mounted within the frame upon an axis parallel to the axis of the frame and upon an axis perpendicular to the first named supporting axis, a follow-up mechanism for maintaining the frame and optical element in predetermined relation to the gyroscope with respect to the axis of the frame and a second follow-up mechanism for maintaining the optical element in predetermined relation to the gyroscope with respect to the axis perpendicular to the axis of the frame.

19. In combination with an unstable platform, a directing device rotatable on said platform and including mechanism for stabilizing the device against angular movement of the platform, a gun movably mounted thereon, and means on said platform controlled by said device and operable by the movement of said platform to hold the gun with its gun pointing axis fixed in a given vertical plane during the rolling and pitching movements of the platform.

20. The combination with an unstable platform, a gun mounted thereon to rotate about a plurality of axes, a director rotatable on said platform and including a directing device and mechanism for eliminating the effect on the device of angular movement of the platform and means controlled by said director and operable by the movements of said platform to rotate the gun simultaneously about said axes to hold the gun with its gun axis fixed in a vertical plane determined by said device during the rolling and/or pitching movements of the platform.

21. The combination with an unstable platform, a sight mounted thereon to rotate about an axis perpendicular thereto and including mechanism for eliminating the effect on the line of sight of the sight of angular movement of the platform, a gun rotatable on said platform about mutually perpendicular axes one of which is perpendicular to said platform, and means interposed between said sight and said mechanism and gun and controlled by said sight and said mechanism and operable by the movements of said platform to hold the gun with its gun axis fixed at a given range angle in a vertical plane passing through the target on which the sight is trained during the rolling and pitching of said platform.

22. An unstable platform, a director rotatable about a fixed axis thereon and including a sight and mechanism for eliminating the effect on the line of sight of the sight of angular movement of the platform, a gun rotatable about its training and trunnion axes on said platform, and means connected to said director and gun and operable by the movements of said platform to rotate the gun about its said axes simultaneously and to hold the gun with its gun axis at a fixed range angle in a vertical plane passing through a target on which the sight is held trained.

23. An unstable platform, a sight, a pendulum, and a gun, each mounted to rotate on said platform about an axis perpendicular thereto, and about a second axis perpendicular to the first named axis; and means connecting said sight, pendulum, and gun to rotate the said pendulum and gun each about its axis perpendicular to the platform in synchronism with the rotation of said sight about its axis perpendicular to said platform.

24. An unstable platform, a gun rotatable thereon, a sight, mechanism for stabilizing the sight against angular movement of the platform, and means connecting the sight and the mechanism to the gun and operable by the movements of the platform to hold the gun with its gun axis at a fixed angle in a vertical plane having a predetermined location relative to the target on which the sight is trained.

25. An unstable platform, a directing device rotatably mounted thereon and including a sight and mechanism for stabilizing the sight against angular movement of the platform, a member mounted to rotate on said platform about mutually perpendicular axes, one of which is perpendicular to said platform, and having a direction pointing axis, and means connecting said member to said device to rotate the member about said axes and maintain it with its pointing axis in a vertical plane determined by said device throughout all movements of the unstable platform.

26. An unstable platform, a directing device rotatably mounted thereon and including a sight and mechanism for stabilizing the sight against angular movement of the platform, a member mounted to rotate on said platform about mutually perpendicular axes one of which is perpendicular to said platform, said member having a pointing axis concurrent with said axes, and means connecting said member to said device to rotate the member about said axes and maintain the member with its pointing axis fixed at a predetermined angle to the horizontal in a vertical plane determined by said device throughout all movements of the unstable platform.

27. An unstable platform, a member having a direction pointing axis and mounted to rotate on said platform, about mutually perpendicular axes one of which is perpendicular to said platform, a directing device rotatable on said platform and including a sight and mechanism for stabilizing the sight against angular movement of the platform, and means connecting said device and member and controlled by the movements of said device and platform to maintain said member with its pointing axis in a vertical plane determined by said device.

28. An unstable platform, a directing device, a pendulum, and a pointing member, mounted to rotate on said platform about parallel axes perpendicular to said platform and about parallel axes parallel to said platform and means connecting said device, pendulum and member to move the latter by and in accordance with the movements of the device and pendulum and maintain the member pointing in a vertical plane determined by said device throughout all movements of said platform.

29. In a fire control apparatus, an unstable platform, a sight rotatable about an axis perpendicular to said platform, a pendulum mounted to rotate about an axis perpendicular to said platform and about mutually perpendicular axes parallel thereto, a gun mounted to rotate about a train axis perpendicular to said platform and about a trunnion axis parallel to the platform, means connecting the sight to the pendulum to rotate the pendulum about its axis perpendicular to said platform in synchronism with the rotations of said sight about its axis, means connecting the sight to the pendulum and gun and operable by the rotation in azimuth of the sight and the movements of the said pendulum about its several axes to rotate the gun about its said axes and maintain it with its pointing axis in a vertical plane determined by the movements of the sight throughout all movements of the platform.

30. In fire control apparatus, an unstable platform, a sight rotatable on said platform, about an axis perpendicular thereto, means for stabilizing the sight about an axis constrained to parallelism with the platform, a gun rotatable on said platform about mutually perpendicular axes and means connecting the sight to the gun and operable by azimuth rotation of the sight and movements of said platform to rotate the gun about said axes and maintain it with its pointing axis in a vertical plane determined by the sight.

31. The combination with a gun, of an unstable platform on which the gun is rotatable about a set of axes varying in angular position with the angular position of said platform, a directing device rotatably mounted on said platform, means for stabilizing the device about an axis constrained to parallelism with the platform, and means controlled by the rotation of said device and operable by the movements of said platform with reference to a fixed set of planes to rotate the gun about its said axes and maintain it fixed relative to said planes.

32. The combination with a gun, of an unstable mount on which the gun is mounted to rotate about relatively fixed train and elevation axes varying in angular position with the angular position of said mount, a directing device rotatable on said mount, means for stabilizing the device about an axis constrained to parallelism with the platform and means controlled by said device and operable by the movements of said mount with reference to vertical and horizontal planes to rotate the gun about its said axes and maintain it fixed relative to said planes.

33. A system of gunfire control comprising a sighting device and a gun mounted on a common moving support and each adjustable about train and elevation axes, means for stabilizing the device against angular movement of the support, means for transmitting the movements of said device about its train axis to said gun, and means for varying said movements during the transmission thereof, in accordance with the movements of said support, to rotate the gun simultaneously about its said axes to hold it with its pointing axis at a predetermined angle to the horizontal in a vertical plane inclined at a predetermined horizontal angle to the vertical plane of the line of sight of said device.

34. In a director firing system for use on an angularly movable platform, the combination of a gun mounted on a trunnion axis, a directing instrument adapted to bear a constant relation to the line of sight to a target, a device for measuring the angular movement of the platform in the vertical plane of the trunnions of the gun, mechanism operatively connected to the device for determining the correctional data for such movement required between the instrument and the gun, separate means settable respectively in accordance with correctional angular displacements of the gun from a line from it to the target in mutually perpendicular planes each containing said line, a signal transmitting system between the instrument and the gun and means operable upon the signal system under the control of the mechanism and the settable means for modifying the signals transmitted to the gun in accordance with the correctional data and displacements.

35. In a director firing system for use on an angularly movable platform, the combination of a gun mounted on a trunnion axis, a directing instrument adapted to bear a constant relation to the line of sight to a target, a gyroscope for measuring the angular movement of the platform in the vertical plane of the trunnions of the gun, mechanism for determining the correctional data for such movement required between the instrument and the gun, a follow-up system between the gyroscope and the mechanism, separable means settable respectively in accordance with correctional angular displacements of the gun from a line from it to the target in mutually perpendicular planes each containing said line, a signal transmitting system between the instrument and the gun and means operable upon the signal system under the control of the mechanism and the settable means for modifying the signals transmitted to the gun in accordance with the correctional data and displacements.

36. In a director firing system for use on an angularly movable platform, the combination of a gun mounted on training and trunnion axes, a directing instrument adapted to bear a constant relation to the line of sight to a target, a device for measuring the angular movement of the platform in the vertical plane of the trunnions of the gun, mechanism operatively connected to the device for determining the correctional data for such movement required between the instrument and the gun about its training and trunnion axes, separate means settable respectively in accordance with correctional angular displacements of the gun from a line from it to the target in mutually perpendicular planes each containing said line, a signal transmitting system between the instrument and the gun and means operable upon the signal system under the control of the mechanism and the settable means for modifying the signals transmitted to the gun in accordance with the correctional data and displacements.

37. In a director firing system for use on an angularly movable platform, the combination of a gun mounted on a trunnion axis, a directing instrument adapted to bear a constant relation to the line of sight to a target, a device for measuring the angular movement of the platform in the vertical plane of the trunnions of the gun and in a vertical plane at right angles to the first named plane, mechanisms operatively connected to the device for determining the correctional data for such movements required between the instrument and the gun, separate means settable respectively in accordance with correctional angular displacements of the gun from a line from it to the target in mutually perpendicular planes each containing said line, a signal transmitting system between the instrument and the gun and means operable upon the signal system under the control of the mechanisms and the settable means for modifying the signals transmitted to the gun in accordance with the correctional data and displacements.

38. In a director firing system for use on an angularly movable platform, the combination of a gun mounted on a trunnion axis, a directing instrument adapted to bear a constant relation to the line of sight to a target, a gyroscope for measuring the angular movement of the platform in the vertical plane of the trunnions of the gun and in a vertical plane at right angles to the first named plane, mechanisms for determining the correctional data for such movements required between the instrument and the gun, operating connections between the gyroscope and the mechanism, separate means settable respectively in accordance with correctional angular displacements of the gun from a line from it to the target in mutually perpendicular planes each containing said line, a signal transmitting system between the instrument and the gun and means operable upon the signal system under the control of the mechanisms and the settable means for modifying the signals transmitted to the gun in accordance with the correctional data and displacements.

39. In a director firing system for use on an angularly movable platform, the combination of a gun mounted on training and trunnion axes, a directing instrument adapted to bear a constant relation to the line of sight to a target, a device for measuring the angular movement of the platform in the vertical plane of the trunnions of the gun and in a vertical plane at right angles to the first named plane, mechanisms operatively connected to the device for determining the correctional data for such movements required between the instrument and the gun about its training and trunnion axes, separate means settable respectively in accordance with correctional displacements of the gun from a line from it to the target in mutually perpendicular planes each containing said line, a signal transmitting system between the instrument and the gun and means operable upon the signal system under the control of the mechanisms and the settable means for modifying the signals transmitted to the gun in accordance with the correctional data and displacements.

40. In a fire control system for ordnance mounted on an unstable platform and adjustable thereon about two axes, a director operatively connected to said ordnance and comprising a target sighting device stabilized about an axis constrained to parallelism with the platform, so that the line of sight of said sighting device is automatically maintained in the vertical plane including the said axis parallel with the platform in all positions of the platform.

41. In a fire control system for ordnance mounted on an unstable platform and adjustable thereon about two axes, a director operatively connected to said ordnance and comprising a target sighting device stabilized about an axis constrained to parallelism with the platform, so that the line of sight of said sighting device is automatically maintained in the vertical plane including the said axis parallel with the platform in all positions of the platform, and means for training the director to maintain the said axis which is parallel with the platform in the vertical plane through the target.

42. In a fire control system for ordnance mounted on an unstable platform and adjustable thereon about elevation and train axes, a director operatively connected to said ordnance and comprising a target sighting device stabilized about an axis constrained to parallelism with the platform, means for training the director to maintain the said axis which is parallel with the platform in the vertical plane through the target, whereby the director transmits to the ordnance the bearing of the said axis parallel with the platform, and automatic means for modifying such bearing for the ordnance to compensate for errors due to cross level.

43. In a fire control system for use upon a support having a reference plane and subject to oscillatory displacement, a plurality of elements in part operable reversely to the direction of the reference plane's oscillatory displacement to establish a stable plane of reference, a device arranged to angularly refer a line of sight to the stable plane and means to combine the measures of the angle of the line of sight and the angles of the reference plane's oscillatory displacement to establish the angle of the line of sight from the reference plane.

HANNIBAL C. FORD.
ELLIOTT P. ROSS.